United States Patent [19]

Taylor et al.

[11] 4,121,791
[45] Oct. 24, 1978

[54] AIRCRAFT BUILT UP FROM INDIVIDUAL READILY ASSEMBLED AND DISASSEMBLED SEGMENTS OR COMPONENTS

[76] Inventors: Bruce G. Taylor, 2040 N. Belmar Ct., Simi Valley, Calif. 93063; C. Gilbert Taylor, 5255 North St., Somis, Calif. 93066

[21] Appl. No.: 819,265

[22] Filed: Jul. 27, 1977

[51] Int. Cl.² .............................................. B64C 1/00
[52] U.S. Cl. ..................... 244/120; 244/91; 244/204
[58] Field of Search ............ 244/119, 120, 16, 122 R, 244/121, 91, 204, 135 R, 90 R

[56] References Cited

U.S. PATENT DOCUMENTS

| 1,568,765 | 1/1926 | Ortego | 244/122 R |
| 2,533,548 | 12/1950 | Backer | 244/121 |
| 2,540,335 | 2/1951 | Johnson | 244/90 R |
| 2,576,981 | 12/1951 | Vogt | 244/91 |
| 2,650,049 | 8/1953 | Fowler | 244/119 X |
| 2,731,220 | 1/1956 | Power | 244/121 |

FOREIGN PATENT DOCUMENTS

| 1,139,372 | 6/1957 | France | 244/16 |
| 452,880 | 11/1949 | Italy | 244/120 |

OTHER PUBLICATIONS

A.P.C. Application of De Muyser, Ser. No. 291,636, Published May 1943.

Primary Examiner—Barry L. Kelmachter
Attorney, Agent, or Firm—Oldham, Oldham, Hudak & Weber Co.

[57] ABSTRACT

A lightweight, segmented, easily assembled aircraft having a hollow fuselage tube, upon which the cockpit, wing, empennage, landing gear, engine, and shell segments are supported and secured, is presented. The wing construction aerodynamically extends the effective wingspan of the aircraft and stabilizes flight by including an aileron slot, which rams positive pressured air from the lower surface of the wing over the upper surface of the wing to laminarize the turbulent air near the ailerons, and including an end plate, which is toed-in and canted towards the upper surface. A fore shell segment separates from and moves fowardly of a fixed, aft shell segment along a track apparatus, secured to the hollow fuselage tube, to permit access to the cockpit of the aircraft.

14 Claims, 9 Drawing Figures

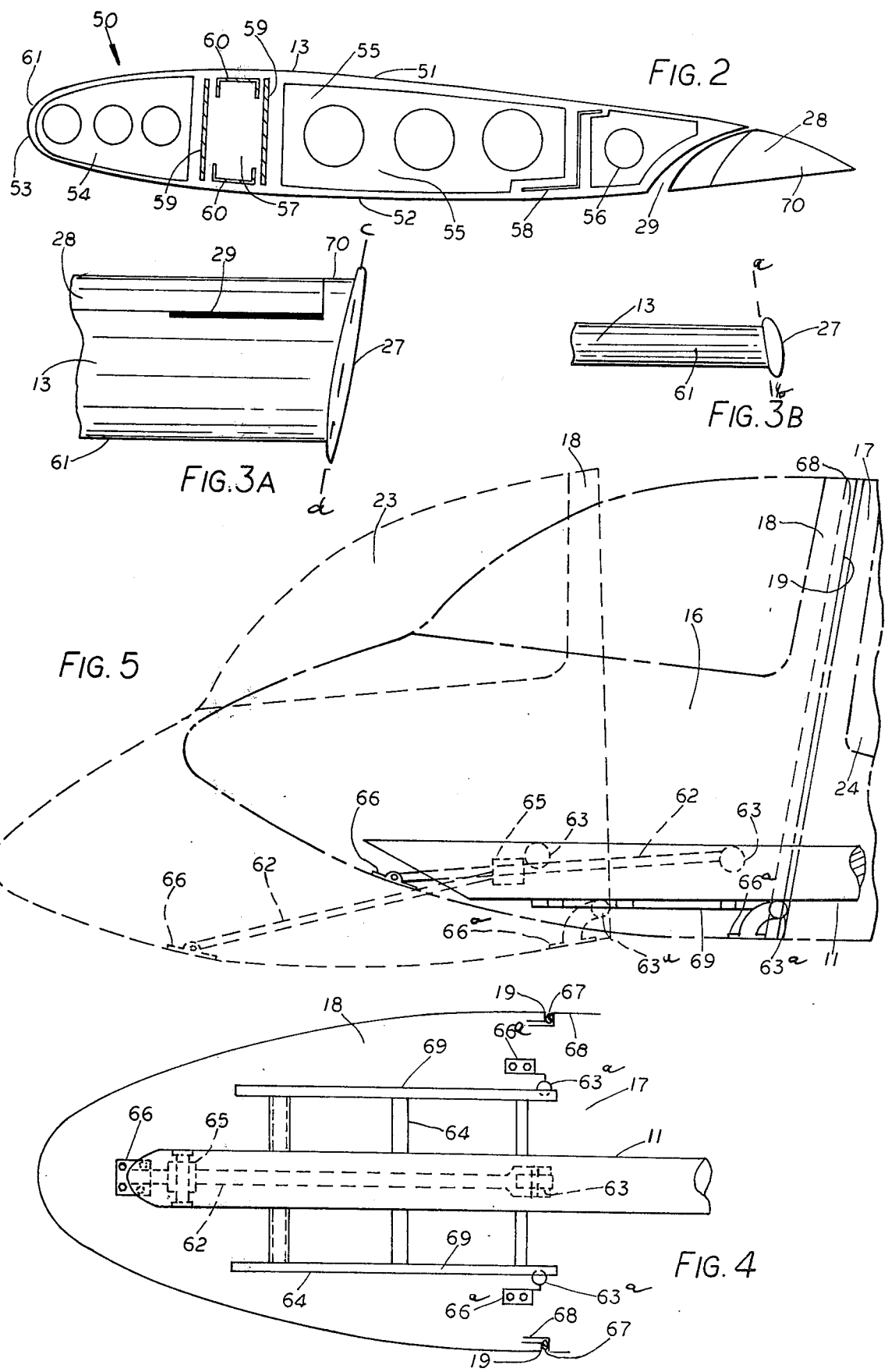

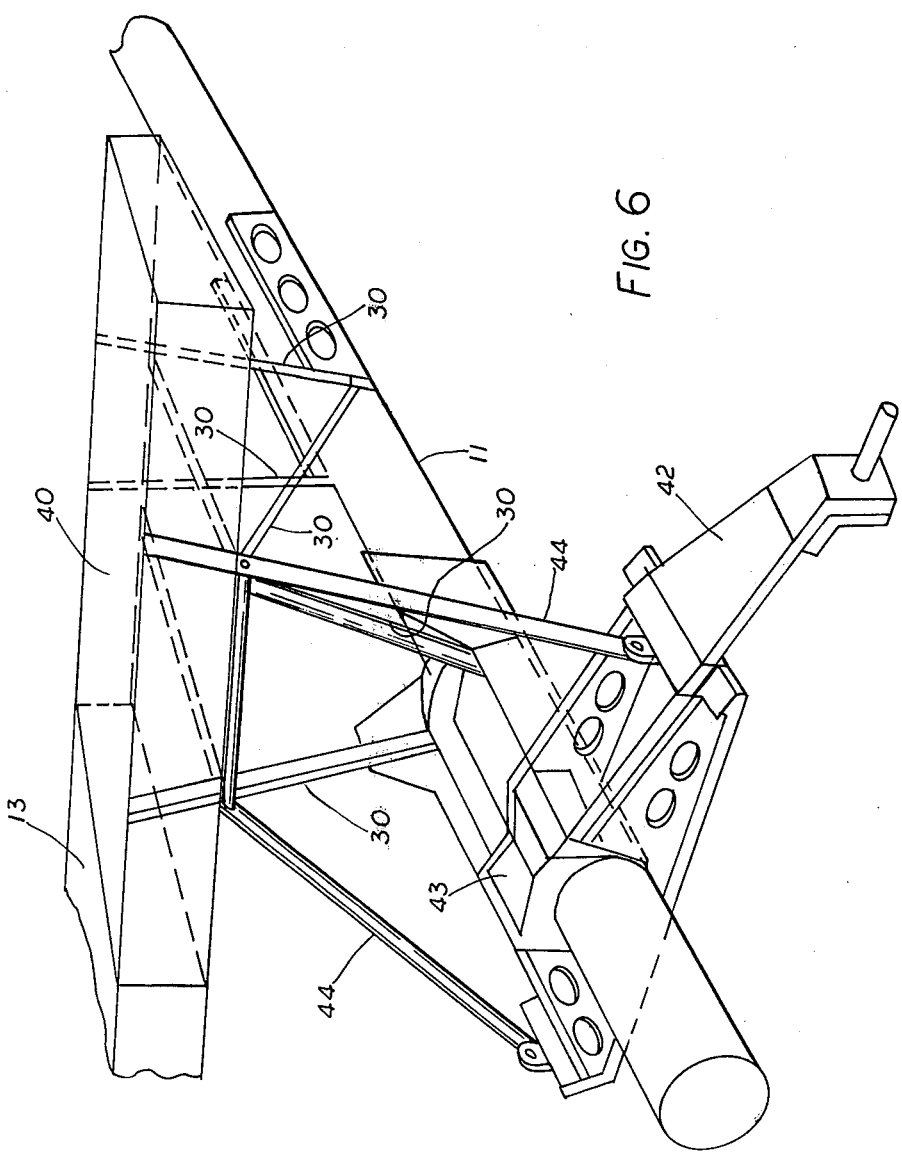

AIRCRAFT BUILT UP FROM INDIVIDUAL READILY ASSEMBLED AND DISASSEMBLED SEGMENTS OR COMPONENTS

BACKGROUND OF THE INVENTION

Heretofore the vast majority of aircraft designed for individual consumer use has been limited to the factory-assembled lightweight passenger aircraft. In terms of the individual consumer, these aircraft are expensive to maintain and expensive to store. Because of these three factors, the availability of lightweight passenger aircraft has been limited to only those individuals which have a special affinity for aircraft of this type, also having the necessary funds available to own such an aircraft. These aircraft are typically housed at hangers at small airports, usually in large metropolitan areas. If no small airport is readily accessible, the consumer is unable to store his aircraft at any truly convenient place. He is unable to store the airplane at his home, for example, and he must travel an appreciable distance in order to enjoy his aircraft.

The cost to acquire one of these factory-assembled aircraft is a significantly large investment for the individual consumer in most cases. Therefore, many individuals who would normally desire to acquire aircraft are economically unable to do so. Some designs for home built aircraft have existed, but the assembling time ranges normally from five to ten years. Again, the vast amount of investment of both time and money makes it economically unfeasible for an individual consumer to purchase a home built aircraft kit of this type. Moreover, even when the home built kit is assembled, it is of the same variety as the factory-assembled aircraft, thereby necessitating a tie-down position at the local small airport. At this point, the same problems that confront the individual consumer who has purchased his airplane from the factory already assembled now confront the consumer who has built his own.

Home built aircraft also encounter aerodynamic deficiencies in construction, such that the possibilities of safe and successful flight are not guaranteed. These small aircraft do not have the proper aerodynamic features which stabilize and streamline the aircraft to withstand the rigors of the various air forces during flight.

Small, lightweight, consumer aircraft also encounter a problem peculiar to their defined use. When flying the aircraft within "close quarters", the aircraft needs to have excellent visibility properties. However, most aircraft of this type described hereinabove, give limited visibility to the pilot. The engine compartment in most aircraft of this type is positioned fore the cockpit area. This significantly reduces the forward and side visibility of the pilot when operating in an obstacle-filled area.

OBJECTS OF THE INVENTION

Consequently, it is an object of ths instant invention to present a lightweight, segmented, home-assembled aircraft which may accommodate two passengers.

It is a further object of the invention to present a lightweight, segmented, easily assembled aircraft wherein the assemblage of the aircraft may be performed by an individual consumer in a relatively brief period of time.

It is a further object of the invention to present a lightweight, segmented, easily assembled aircraft wherein the aircraft is constructed using a basic hollow tube upon which the pylons, wings, and various aircraft components are assembled.

Yet a further object of the invention is to present a lightweight, segmented, easily assembled aircraft wherein the wings of said airplane are detachable or foldable to facilitate storage and transfer of the aircraft before and after flight.

Still a further object of the invention is to present a lightweight, segmented, easily assembled aircraft wherein the key structural features of the aircraft are located at approximately the same point, thereby improving the balance and stability of the aircraft during flight.

It is yet another object of the invention to present a lightweight, segmented, easily assembled aircraft wherein the shape of the aircraft is streamlined for good stability and highly maneuverable for low altitude flight.

Still a further object of the invention is to provide a lightweight, segmented, easily assembled aircraft wherein the construction of the wing aerodynamically extends the effective wing span for more stable flight where an improved air flow is provided by an aileron slot and by a toed-in canted wing end plate.

Another object of the invention is to provide an aircraft wherein the engine compartment and propeller apparatus are placed aft the cockpit, and a pusher propeller apparatus is utilized located in the mid section of the fuselage.

Yet a further object of the invention is to provide a lightweight, segmented, easily assembled aircraft wherein the position of the cockpit, the wings and engine compartment allows the pilot to have excellent visibility forward, sideward, upward, and downward.

Still a further object of the invention is to provide a lightweight, segmented, easily assembled aircraft wherein the streamlined shell of the aircraft separates to permit access to the cockpit area.

Yet a further object of the invention is to present a lightweight, segmented, easily assembled aircraft wherein said aircraft has a sliding track mounted on the basic tube to permit a fore portion of the shell to slide away from the aft, fixed portion of the shell, thus permitting access to the cockpit.

These objects and other objects which will become apparent as the detailed description proceeds are achieved by the apparatus described hereinafter.

DESCRIPTION OF THE DRAWINGS

For a complete understanding of the objects, techniques, and structure of the invention, reference should be had to the following detailed description and accompanying diagrammatic drawings, wherein:

FIG. 2 is a cross sectional diagrammatic view of the construction of the wing;

FIGS. 3A and 3B are fragmentary top plan and front plan views, respectively, of the wing tip and end plate;

FIG. 4 is a sectional diagrammatic plan view of the fore shell showing the construction of the track upon which the fore shell separates from the aft shell;

FIG. 5 is an illustrative diagrammatic side view showing the separation of the fore shell from the aft shell to permit access to the cockpit; and FIG. 6 is an interior diagrammatic perspective view of the pylon support structure for the landing gear and wings, as attached to the fuselage tube.

DETAILED DESCRIPTION OF THE PREFERRED EMBODIMENT

Figure 1A:
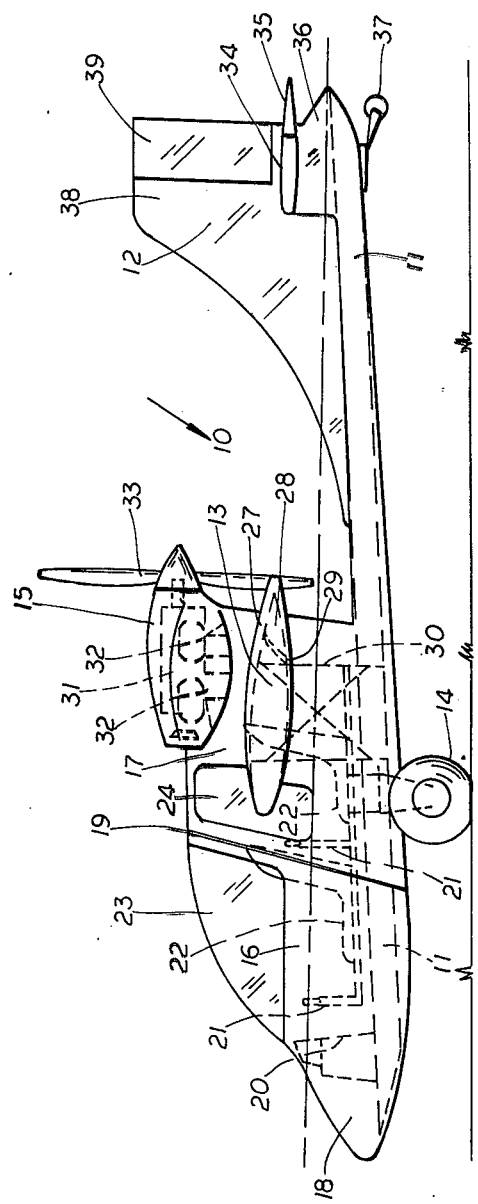
FIG. 1 is composed of FIGS. 1A through 1C which show the side, top, and front plan views, respectively, of the lightweight, segmented, easily assembled aircraft of the invention.
Figure 1C:
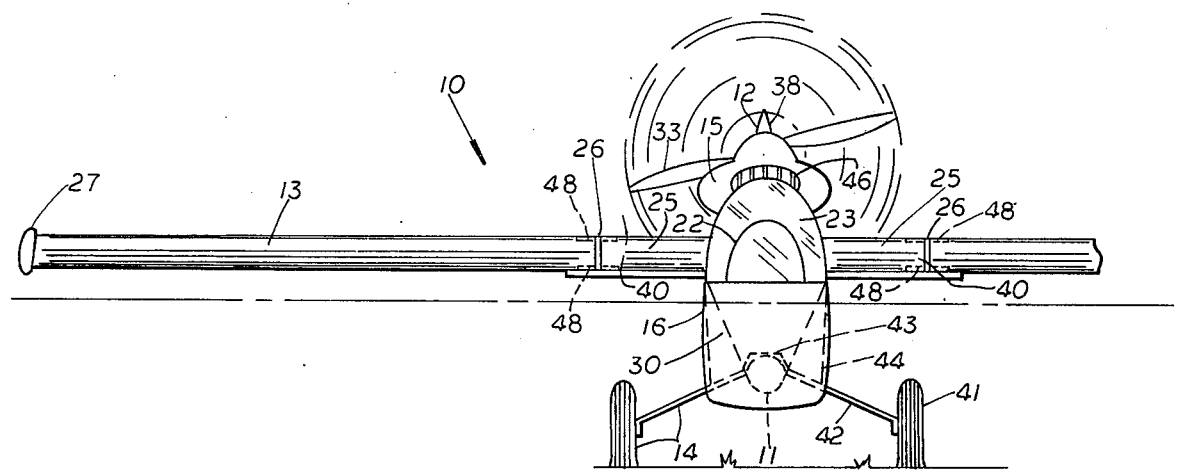
Figure 1B:
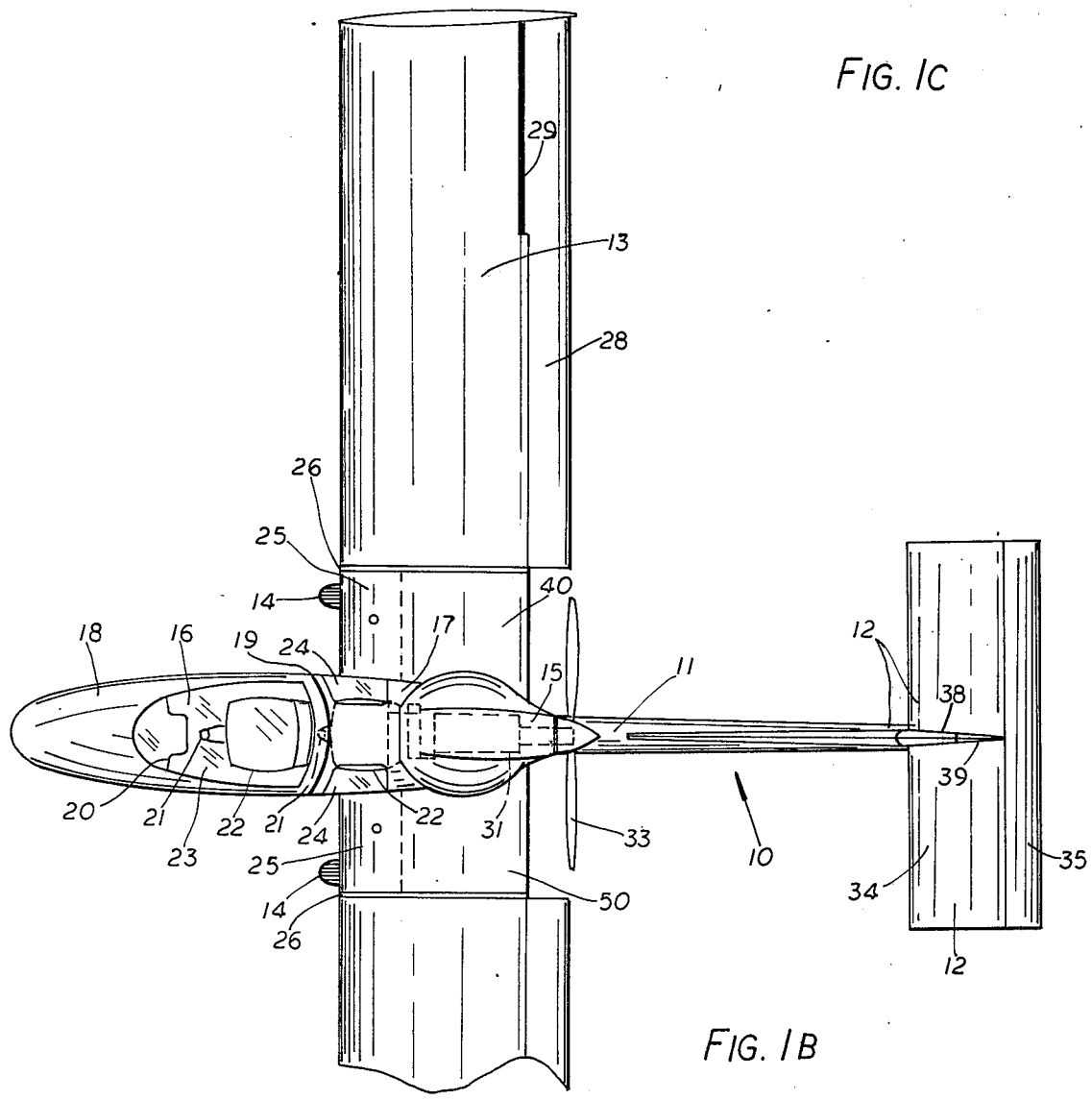

Referring now to the drawings, and more particularly to FIGS. 1A through 1C, an understanding of the structure of the invention may be achieved. The lightweight, segmented, easily assembled aircraft 10 is composed of the following segments: the fuselage tube 11, the empennage 12, the wing 13, the landing gear apparatus 14, the engine compartment 15, the cockpit 16, the fixed wing segment 40, the aft shell 17, and the fore shell 18. The fuselage tube 11 extends the length of the aircraft 10 and serves as the beam upon which each of the above segments is assembled. The tube 11 may be made from any material known in the aircraft art that exhibits lightweight, but sturdy properties. At the fore portion of the fuselage tube 11 is the cockpit area 16 housed within the fore shell 18. The cockpit area 16 contains a suitable instrument panel 20, conventional control means 21, including a control stick, and two seats 22 for the pilot and his passenger. While the passenger seat nearer to the wing 13 is fixed in position, the pilot's seat 22 at a position fore the wing 13 is adjustable by use of any conventional slide or other mount means to maintain proper balance of the aircraft 10 when pilots of different size and shape control the craft.

The fore shell 18 and aft shell 17 are made of material that is suitable and known in the aircraft art for exhibiting streamlined, lightweight, and sturdy properties. The fore shell 18 contains a large windshield 23 permitting the pilot to have excellent visibility forward, sideward, upward and downward from the aircraft 10 during all phases of flight. Aiding the pilot's visibility rearward and the passenger's view are two windows 24 contained within the aft shell 17. Between the aft shell 17 and the fore shell 18 is a shell interface 19 which will be described in greater detail with reference to a later figure.

The mid-section of the fuselage tube 11 engages all of the key structural features of the aircraft 10. The engine compartment 15 is supported by a main pylon support 30, and contains a suitable engine 31 for lightweight aircraft flight. This engine 31 is supported within the engine compartment 15 by known engine supports 32 and is covered by a streamlined curved section of the aft shell 17. The crank shaft of the engine 31 is directly connected to a propeller 33 which serves to push the air during flight. As shown in FIG 1A, the position of the engine compartment 15 is above both wing 13 and cockpit 16 which permits greater air flow against which the propeller 33 may push the aircraft 10. FIG. 1C shows the air intake 46 for the engine compartment 15 as well as the overall streamlined appearance of the fore shell 18 and the aft shell 17.

Extending from and suitably secured to the fuselage tube 11 at its mid section are fixed wing segments 40. Contained in the forward portions of the fixed wing segments 40 are the fuel compartments 25, the positions of which are very crucial in relation to the overall craft balance and weight stabilization. The detachable or foldable wing 13 attaches to the fixed wing 40 at the wing-fixed wing interface 26 by use of joint bracket or hinge apparatus 48, composed of any known, suitable material for securing two heavy objects, as best seen in FIG. 1C. The detachable or foldable wing 13 also contains ailerons 28, an aileron slot 29 and end plates 27, which will be discussed in greater detail with reference to a later figure.

The empennage 12 is composed of a horizontal stabilizer 34, vertical stabilizer 38, tail cone 36, and tail wheel 37, which are all mounted on the fuselage tube 11. On the aft portion of the horizontal stabilizer 34 are the elevators 35. Likewise, on the aft portion of the vertical stabilizer 38 is the rotor 39, the parts all being diagrammatically illustrated.

The design of this aircraft 10 allows easy assemblage about the fuselage tube 11. The wings 13 are made detachable, or foldable by suitable means which permit easy transportation and storage of the craft 10 before and after flight. The position of the fixed wing segment 40, the foldable or detachable wing 13, the landing gear apparatus 14, the engine compartment 15, and the main pylon support 30 all at the mid section of the fuselage tube 11 give the aircraft 10 great stability and balance. This permits the two place aircraft 10 to have a forward cockpit 16 which improves visibility in every direction. The aircraft 10 is lightweight and designed for only two passengers, its wing span being approximately 30 ft. long and its approximately 20 ft. long. With its overall size being so small, the aircraft 10 may be stored at the home, either assembled or disassembled.

The aircraft 10 has an extremely short take-off distance, estimated to be approximately 200 ft. which permits the aircraft 10 to be flown in "close quarters". As seen in FIGS. 1C and 6, the landing gear apparatus 14 is very sturdily assembled. The apparatus 14 is composed of landing wheel 41, landing struts 42 that are secured to saddle support casting 43 which is mounted on the fuselage tube 11, and support tubes 44. The size of the landing wheels 41 and the structure of the landing gear apparatus 14 in general allow the aircraft 10 to be flown from dirt runways or smooth fields. This design feature also permits the individual consumer to own and maintain the aircraft 10 for storage at home and use in the rural countryside.

Referring now to FIG. 2, it shows a diagram of the wing 13. A wing cross section 50 shows the top skin 51, the bottom skin 52, and the leading edge skin 53, all made from material that is well known in the art for its lightweight and sturdy properties. The wing 13 has two spars, a front box spar 57 and a rear "Z" spar 58. The front box spar 57 has been separated to show its components only for purposes of illustration.

The box spar 57 is composed of box spar webs 59 and box spar caps 60, this structure carrying approximately 90% of the weight of the foldable wing 13. Between the box spar 57 and the leading edge 61 is the nose rib 54. Between the two spars 57 and 58 is the center rib 55, and after the "Z" spar 58 is the close-out rib 56. All three rib portions are made from suitable lightweight material known in the art for wing construction and all contain hollow portions which reduce the weight as well.

At the trailing edge 70 of the wing 13 is the usual aileron 28 and the aileron slot 29. The aileron slot 29 is contained forward of the controllable ailerons 28 is intended to blow a sheet of positive pressured air across the top of the ailerons providing lateral control well below the stall. A normal wing known to the art has the positive pressure on the lower surface and reduced air pressure over the top surface. There is also a boundary of air which flows around the wing. By using the positive air pressure on the bottom of the wing to pass through the wing by means of the slot 29, significant aerodynamic changes take place. The boundary air is sped up and the flow of air over the top side of the wing is straightened out, thereby reducing the normally turbulent air, most prevalent at the wing tip. The turbulence of the air at the wing tip is due to the higher pressure of the air on the bottom of the wing and the lower pressure of the air on the top of the wing causing air flow around the wing tip causing extreme turbulence. By the use of the aileron slot 29, the pressure of the air going through the slot 29 helps to straighten the air flow along the bottom of the wing which in turn pulls the boundary layer on the top of the wing.

The cross sectional area of the slot is larger at the bottom entrance and narrows to a smaller slot sectional area at the top of the wing. This geometry rams the air into the slot and increases the velocity of the flow of the air over the top of the wing. This reduces the high drag wing tip vortex, thereby reducing the drag and increasing the lift of the wing 13. The incorporation of this slot is a vast improvement over wing design for airplanes known in the art because there is normally a loss of lift over approximately half of the chord of the wing on each wing tip.

This geometry also results in more effective wing area over that used in the art, because the flow of air over the wing tip area is maintained in a more laminar state. The reduction in turbulence greatly stabilizes the aircraft, which is essential for an aircraft 10 with the wing span approximately 30 ft. long. Each aileron slot 29 may extend the entire length of the foldable wing 13, although in this preferred embodiment being disclosed herein, the aileron slot 29 extends approximately 2 ft. from the wing tip towards the fuselage tube 11.

Referring now to FIGS. 3A and 3B, an understanding of the end plate 27 may be had. The foldable wing 13 has a leading edge 61, which is seen in the top plan view of FIG. 3A and the front view of FIG. 3B. At the tip of the wing 13 is the end plate 27 that usually is made from one flat member. The aileron 28 and the aileron slot 29 extend from the tip of the wing back towards the fuselage tube 11. The end plate 27, besides generally extending adjacent the effective wingspan, is slightly toes-in to provide for greater flight stability and maintenance of course direction. The angle of this toed-in end plate 27 is small, but very significant, such as about 20°, in that is assists the rudder greatly in maintaining a stable course direction which is crucial for an aircraft 10 of this size. Additionally, the canting of the end plate 27 towards the top surface of the wing 13 provides a secondary lateral stabilization means. The angle of the canting is slightly greater than the angle for the toe-in, and it may be, for example, about 10°. The combination of the aileron slot 29 and the positioning of the end plate 27 utilizes efficiently and effectively increases the span of the wing and maintains true aerodynamic lift properties out to the top itself. These significant stabilization means greatly improve the aerodynamics of the wing 13 for this aircraft 10.

Referring now to FIGS. 4 and 5, the sliding fore shell 18 construction is illustrated therein. FIG. 4 is a sectional view of the fore shell 18 showing the fuselage tube 11 and the fore shell rack 64 secured to the tube 11. Within the fuselage tube 11 is a metal tube 62 one end of which is pivotally attached to a bracket 66 secured to the forward edge of the fore shell 17 and the other end of which is attached to a roller 63 which rolls along the upper inside diameter of the fuselage tube 11. Positioned at a point close to the end of the fuselage tube 11 is a fixed guide 65 which prohibits movement of the roller 63 and steel tube 62 beyond its fixed point of attachment. On both sides of the shell rack 64 are rails 69 which two other rollers 63a engage and travel therealong. These rollers 63a are pivotally secured to brackets 66a which are on the interior aft surface of the fore shell 18. As better seen by FIG. 5, the fore shell 18 disengages from the aft shell 17 at the shell interface 19 and slides down the rails 69 until the tube 62 and roller 63 engage the fixed guide 65. The declination of the fore shell 18 is approximately 15°, and it moves along the rails 69 far enough to permit easy access by the pilot and passenger to the cockpit 16. It must be remembered that the instrument panel 20, control instrumentation 21, seats 22 are all attached to the fuselage tube 11 and do not move while the fore shell 18 travels down the rails 69. When the fore shell 18 is disengaged from the shell interface 19, it is supported by brackets 66 and 66a located at three positions on the bottom surface of the shell 18. However, when the fore shell 18 is engaged to the fixed, aft shell 17, the instrument panel 20 also serves as a support means for the shell 18.

Once the pilot and his passenger are in their seats 22 within the cockpit 16, the fore shell is manually pulled back into its proper position along the shell interface 19. An examination of the shell interface 19 reveals significant aerodynamic and closure features. Between the fore shell 18 and the aft shell 17 at the shell interface 19 is a shell seal 67 made out of suitable material for tightly but flexibly enclosing the entire shell interface 19. At the shell interface 19, the fore shell 18 engages the rear shell lip 68 of the fixed, aft shell 17. The combination of the rear shell lip 68 and the shell seal 67 effectively rejoin the two shells 17 and 18 into one unit aerodynamically and structurally. This single unit structure may be maintained by the use of suitcase-type latches or the like which may be placed on the inside or also the outside of the aircraft 10 at the shell interface 19. Any suitable latching means which is well known to the art and adaptable to this particular use is sufficient.

Referring now to FIG. 6, a further understanding of the structure of the aircraft 10 may be had. The fuselage tube 11 is surrounded by and is secured to the saddle support casting 43 which connects the landing gear apparatus 14 to the fuselage tube 11. The landing struts 42 extend from the saddle support casting 43, and the support tubes 44 are suitably secured to the assembly and extend up from the juncture between the saddle support casting 43 and the landing strut 42 at such an angle to engage the structure of the main pylon support 30. The main pylon support 30 is an open elongated frame that engages and is secured to the fuselage tube 11 at spaced points aft the saddle support casting 43. The main pylon support 30 supports the wing 13, the fixed wing segment 40, and the engine compartment 15. The limited structural features of the aircraft 10 provide both easy assemblage and reduced overall weight. Furthermore, because the key structural features are all located at and secured to the mid section of the fuselage tube 11, they may be interconnected as shown in FIG. 6 to provide overall greater structural stability for the aircraft 10.

Sectioning is omitted in the drawings in many places for simplicity and the principles of the new aircraft are shown by the diagrammatic views presented herewith. Conventional controls in the aircraft also are omitted in the drawings.

It should now be readily apparent that a structure has been presented whereby a lightweight aircraft in segments may be readily assembled by an individual, for use on dirt runways or level fields, and capable of storage at the home.

While in accordance with the patent statutes, only the best mode and preferred embodiment of the invention has been presented and described in detail, it is to be understood that the invention is not limited thereto or thereby. Consequently, for an appreciation of the scope and breadth of the invention, reference should be had to the following claims.

What is claimed is:

1. A segmented, easily assembled aircraft comprising:
    a hollow, straight, one-piece fuselage tube extending uninterrupted the entire length of the aircraft,
    a cockpit and a fore shell supported by and mounted upon a fore section of said hollow fuselage tube,
    a main wing pylon and a main landing gear,
    and support means supported by and mounted upon said hollow fuselage tube, said support means surrounding said tube, extending laterally from said fuselage tube and securing said landing gear and said main wing pylon to said tube,
    an empennage assembly supported by and mounted upon the aft section of said hollow fuselage tube, and
    an engine compartment, a wing, and an aft shell supported by and mounted upon said main pylon.

2. An aircraft as recited in claim 1 wherein said cockpit contains a track apparatus upon which said fore shell is slidably mounted for forward movement, said track apparatus being operably supported by and mounted upon said hollow fuselage tube by means including a roller received within said tube and a link arm pivotally connected to said roller and protruding from an open front end of said tube and pivotally engaging said fore shell, and guide and limiter means for said link arm within said tube and engaging said link arm.

3. An aircraft as recited in claim 1 wherein said cockpit has a forward seat, and a rearward seat, said rearward seat being operably mounted and fixed upon said hollow fuselage tube, and
    said forward seat being operably mounted but slidable upon said hollow fuselage tube for stabilizing the balance of the aircraft in relation to the size of the individual operating the aircraft.

4. An aircraft as recited in claim 1 wherein the midsection of said hollow fuselage tube, through said main pylon, supports said engine compartment, said wing and said landing gear apparatus of the aircraft for improving the stability, balance, and maneuverability of the aircraft during all stages of flight by concentrating the center of gravity on said mid-section of said hollow fuselage tube,
    said engine compartment, said wing, and said landing gear apparatus positioned aft of said cockpit improving visibility forward, upward, downward, and sideward during all stages of flight, and engine powering a pusher propeller, and said pusher propeller and said engine being located above said wing and said fore shell permitting greater air flow against which said pusher propeller may push the aircraft.

5. An aircraft as recited in claim 1 wherein said wing has a wing tip, an upper surface, a lower surface, an aileron, an end plate at the tip of said wing, and an aileron slot immediately forward of said aileron on said wing.

6. An aircraft as recited in claim 5 wherein said end plate is toed-in and canted toward the upper surface of said wing for improving the stability of the aircraft during flight and extending the effective wingspan of the aircraft.

7. An aircraft as recited in claim 5 wherein said aileron slot extends from the lower surface of said wing up through it to the upper surface of said wing immediately forward of said aileron,
    said slot having a greater sectional surface area at said lower surface of said wing and a smaller sectional surface area at said upper surface of said wing permitting positive pressured air from said lower surface to ram into said slot, and
    said positive pressure air laminarizing turbulent air above said upper surface of said wing, stabilizing the aircraft during flight and extending the effective wingspan of the aircraft.

8. An aircraft as recited in claim 1 wherein a track apparatus, supported by and mounted upon said fuselage tube upon which said fore shell slides forwardly from said aft shell for permitting access to said cockpit is provided, said fore shell has roller means for sliding on said track apparatus and bracket means for securing said fore shell to said roller means, said tube housing one track of said track apparatus for one of said roller means, and said tube having a stopper means therein for halting the sliding of said roller means along said one track.

9. An aircraft as recited in claim 6 wherein said toed-in angle is less than said canting angle toward said upper surface for providing stabilized course direction of the aircraft.

10. An aircraft as recited in claim 1 wherein said wing has a wing tip, an upper surface, a lower surface, an air deflector member movably positioned on said wing, an end plate at the tip of said wing, and a wing slot immediately forward of said air deflector member.

11. An aircraft as recited in claim 10 wherein said wing slot extends from the lower surface of said wing to the upper surface of said wing and
    said slot having a greater sectional area at said lower srufrace of said wing than at said upper surface of said wing to increase the speed movement of air flowing through said slot.

12. An aircraft as recited in claim 10 wherein said end plate is toed-in and canted toward the upper surface of said wing for improving the stability of the aircraft during flight and extending the effective wingspan of the aircraft, and said toed-in angle is less than said canting angle toward said upper surface.

13. An aircraft as recited in claim 1 wherein said cockpit contains a track apparatus upon which said fore shell is slidably mounted for forward movement, said fore shell forms an enclosure, and said track apparatus is operably supported by and mounted upon said fuselage tube.

14. An aircraft as recited in claim 13 wherein guide and motion limiter means operably connect said fore to said fuselage tube to stop forward movement of said fore shell.

* * * * *

UNITED STATES PATENT OFFICE
CERTIFICATE OF CORRECTION

Patent No. 4,121,791     Dated October 24, 1978

Inventor(s)   Bruce G. Taylor and C. Gilbert Taylor

It is certified that error appears in the above-identified patent and that said Letters Patent are hereby corrected as shown below:

Column 1, line 58, "ths" should be -- the --.

Column 4, line 23, "length" should be inserted before "approximately"

Column 4, line 59, "and" should be inserted after "28" and before "is"

Column 5, line 42, "toes-in" should be -- toed-in --

Column 5, line 45, "is" should be -- it --

Claim 11, line 46, "sruface" should be -- surface --

Signed and Sealed this

Sixth Day of February 1979

[SEAL]

Attest:

RUTH C. MASON
Attesting Officer

DONALD W. BANNER
Commissioner of Patents and Trademarks